Feb. 8, 1966  J. C. BOONE  3,233,909

LEVELING SYSTEM FOR HILLSIDE COMBINES

Filed April 24, 1964  3 Sheets-Sheet 1

Inventor
Jerry C. Boone
By *[signature]*
Attorney

Feb. 8, 1966   J. C. BOONE   3,233,909
LEVELING SYSTEM FOR HILLSIDE COMBINES
Filed April 24, 1964   3 Sheets-Sheet 3

Inventor
Jerry C. Boone
By W. [signature]
Attorney

United States Patent Office 3,233,909
Patented Feb. 8, 1966

3,233,909
LEVELING SYSTEM FOR HILLSIDE COMBINES
Jerry C. Boone, Independence, Mo., assignor to Allis-Chalmers Manufacturing Company, Milwaukee, Wis.
Filed Apr. 24, 1964, Ser. No. 362,321
8 Claims. (Cl. 280—6)

The invention relates to hillside combines, and it is concerned more particularly with a system for automatically maintaining the main body of the combine level under varying slope conditions of the ground which is traversed by the combine.

In the operation of hillside combines, it is desirable to have the machine level rather slowly when only small corrections are to be made so that the leveling action is not bothersome or tiresome to the operator. On the other hand, fast leveling is needed when the lay of the ground is changing rapidly and the combine appears to be getting too far out of level.

The principal object of the present invention is to provide an automatic leveling system for hillside combines which will take care of the above mentioned requirements.

More specifically, it is an object of the invention to provide an improved control system for a hydraulically operated leveling mechanism by means of which the combine body may be righted from laterally inclined positions; the improved control system being operative to supply the leveling mechanism with pressure fluid at a predetermined rate upon lateral tilting of the combine body through a predetermined angle in either direction, and to increase the rate of pressure fluid delivery to the leveling mechanism when the combine body tilts laterally beyond said predetermined angle in either direction.

A further object of the invention is to provide an improved automatic leveling system of the above mentioned character incorporating valve actuating solenoids and level sensitive electrical switches for sequentially energizing the solenoids upon progressive tilting of the combine body in either direction.

A still further object of the invention is to provide an improved leveling system of the above mentioned character incorporating valve actuating solenoids and an auxiliary manually operable switch by means of which the operator of the combine may override automatic operation of the system whenever he wishes to do so.

A still further object of the invention is to provide an improved leveling system of the above mentioned character which is relatively simple and inexpensive in construction, efficient and reliable in operation, and which may be installed on hillside combines to replace a preexisting leveling system thereon.

These and other objects and advantages are attained by the present invention, various novel features of which will be apparent from the description herein and will be pointed out in the appended claims.

Referring to the accompanying drawings.

Figure 1:
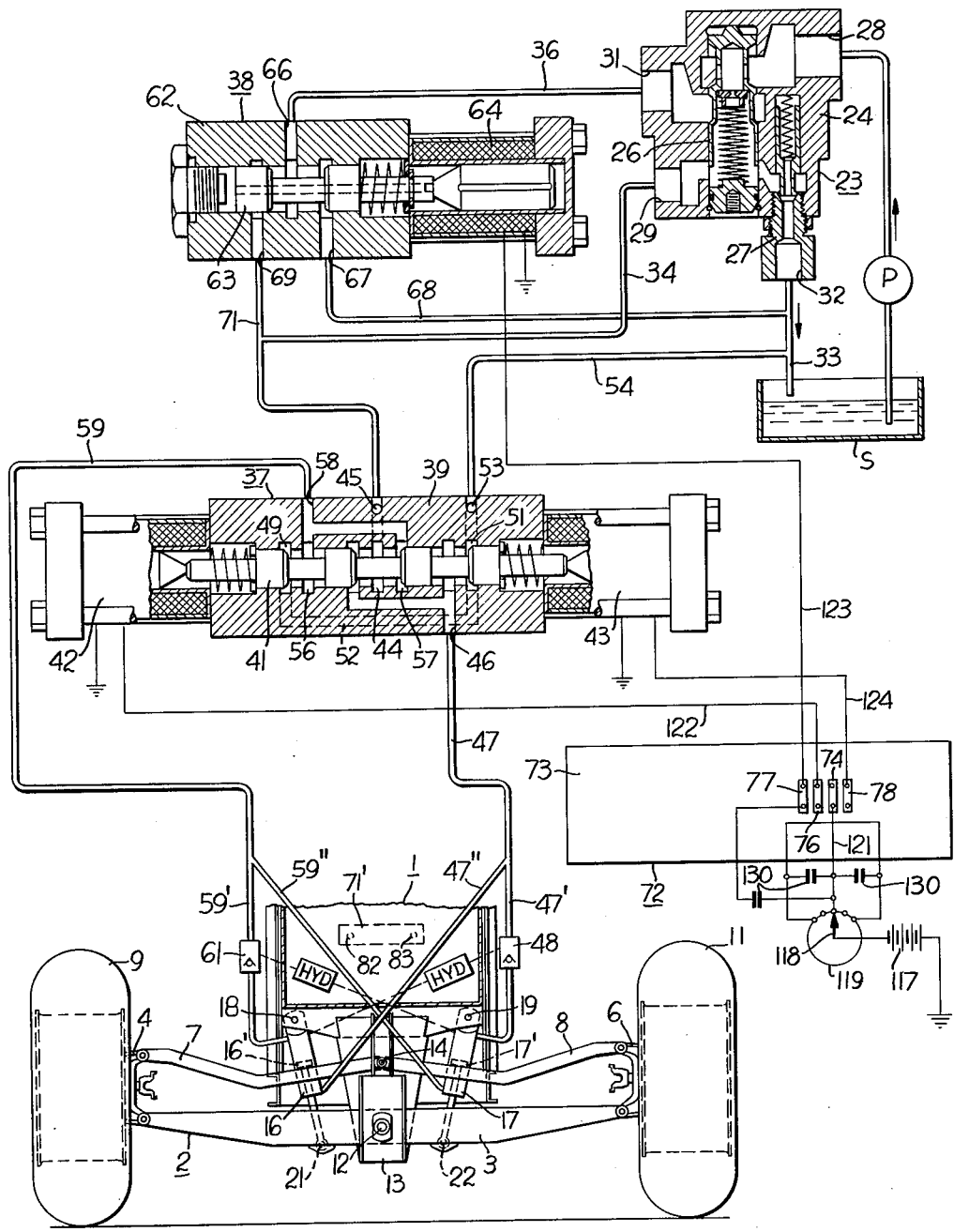
FIG. 1 is a diagrammatic view of an automatic leveling system for hillside combines embodying the invention.

In FIG. 1, part of a hillside combine is shown in front elevation and comprises a body structure 1 and a front axle structure 2 in supporting relation to the body structure. The axle structure 2 is of conventional parallelogram type and comprises an axle beam 3, wheel carriers 4 and 6, guide links 7 and 8, and rubber tired power driven front wheels 9 and 11. The axle beam 3 has a pivot connection 12 on a horizontal fore and aft extending axis with a depending bracket assembly 13 of the body structure, and the guide links 7 and 8 have a similar pivot connection 14 with the bracket assembly 13 above the pivot connection 12.

A pair of double acting hydraulic cylinders 16 and 17 of conventional construction are operatively interposed between the body structure 1 and the axle beam 3 for leveling the body structure 1 and maintaining it in the upright position in which it is shown in FIG. 1, under varying slope conditions of the ground which is traversed by the combine. The head ends of the leveling cylinders 16 and 17 have pivot connections 18, 19, respectively, with the body structure 1, and the piston rods of the leveling cylinders have pivot connections 21 and 22, respectively, with the beam 3 of the axle structure 2.

The hydraulic system for controlling operation of the leveling cylinders 16 and 17 in accordance with the present invention is suitably installed on the body structure 1 of the combine. For purposes of explanation, various components of the system are shown in FIG. 1 diagrammatically apart from the body structure 1, and hydraulic and electric connections are indicated only schematically.

The symbol P in FIG. 1 represents a volumetrically constant source of pressure fluid. In practice, such a source is preferably afforded by a gear pump which is conventionally driven by the propelling engine of the combine. At its suction side the pump P is connected with a sump S, and at its pressure side the pump P is connected with a flow divider valve generally designated by the reference character 23. The valve 23 as shown in FIG. 1 is of conventional construction and known as a priority flow divider. It comprises a housing 24, a reciprocable valve spool 26, and a relief valve 27. Pressure fluid from the pump P enters the valve housing 24 through an inlet port 28, and the spool 26 functions in conformity with well known principles of operation, to automatically maintain a predetermined flow of pressure fluid through a divisional flow outlet port 29 and to discharge excess fluid through a divisional flow outlet port 31. The relief valve 27 is normally closed but under excessive pressure conditions discharges pressure fluid through an outlet port 32 and associated conduit 33 into the sump S.

The outlet ports 29 and 31 of the flow divider valve 23 are connected to conduits 34 and 36, respectively. The conduit 34 serves as a supply line for a primary control valve generally designated by the reference character 37, and the conduit 36 serves as a supply line for a secondary control valve generally designated by the reference character 38.

The primary control valve 37 as shown in FIG. 1 is a three position, dual solenoid controlled spool valve of well known conventional construction. It comprises a housing 39, a reciprocable spring centered valve spool 41, a first solenoid 42 which when energized moves the valve spool 41 to the right in FIG. 1, and a second solenoid 43 which when energized moves the valve spool 41 to the left in FIG. 1. The housing 39 has an inlet chamber 44 and associated inlet port 45 in communication with the supply conduit 34. A first outlet port 46 of the valve housing 39 is connected to a conduit 47 which has two branches, one designated by the reference character 47′ and leading to the upper end of the leveling cylinder 17, and the other designated by the reference character 47″ and leading to the lower end of the leveling cylinder 16. The branch 47′ includes a hydraulically piloted check valve 48 for trapping fluid above the piston of the cylinder 17, as will be explained more fully hereinbelow.

Outlet chambers 49 and 51 of the valve housing 39 are connected with each other by an internal passage 52 which is extended to a second outlet 53 of the valve housing 39. The second outlet 53 communicates with the sump S through a conduit 54.

Outlet chambers 56 and 57 of the valve housing 39 communicate with a third outlet 58 which is connected with a conduit 59. A branch 59' of the conduit 59 leads to the upper end of the leveling cylinder 16 and includes a hydraulically piloted check valve 61 similar to the check valve 48. Another branch 59" of the conduit 59 leads to the lower end of the leveling cylinder 17.

Figure 2:
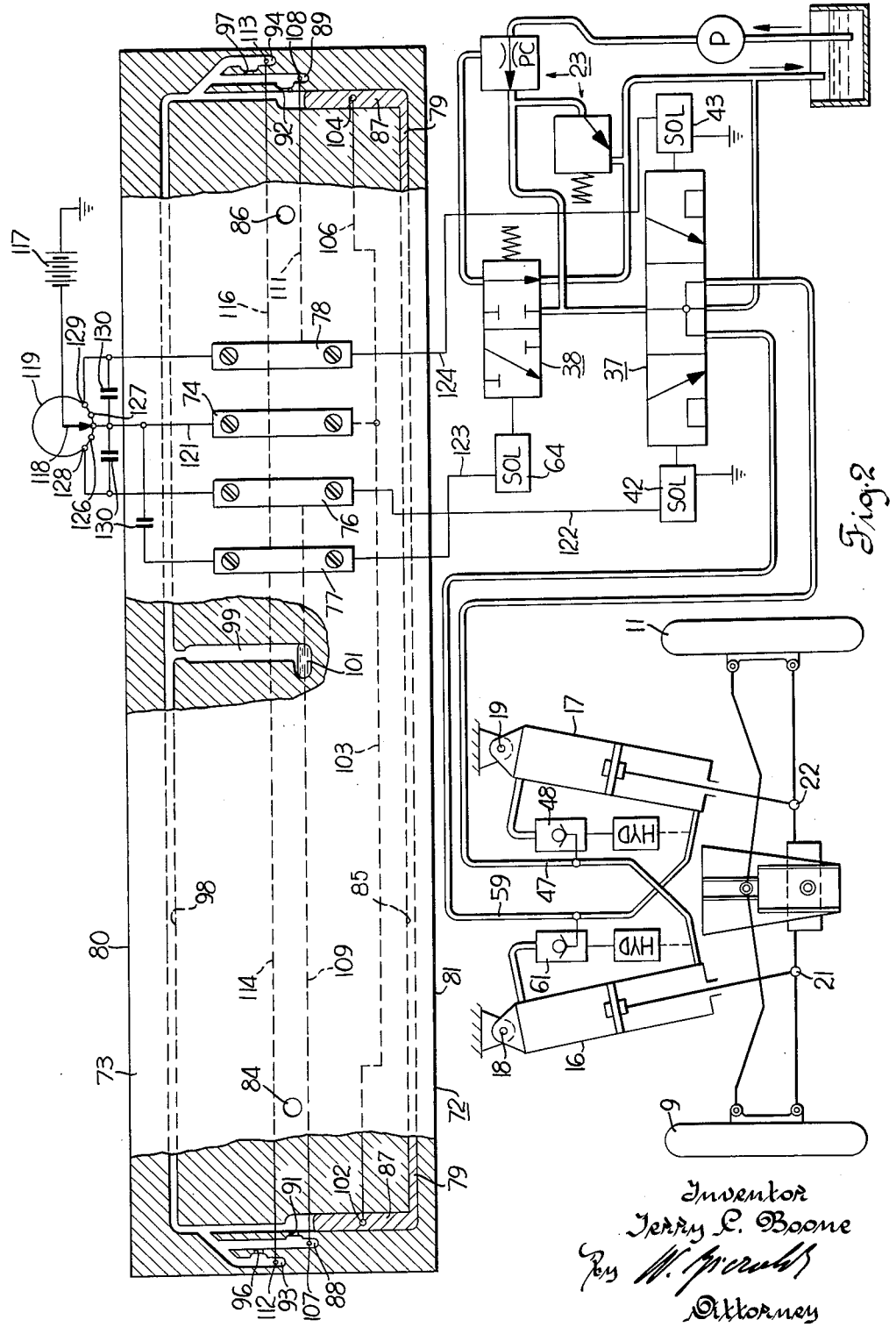
FIG. 2 is a detail view of a mercury switch incorporated in the system shown in FIG. 1, other components of the system being indicated in FIG. 2 by conventional symbols.

When both solenoids 42 and 43 are deenergized the primary valve 37 assumes the neutral position in which it is shown in FIG. 1 and diagrammatically in FIG. 2. In that condition pressure fluid entering through the inlet port 45 into inlet chamber 44 is free to return to sump through outlet chamber 51, second outlet 53 and conduit 54. Pressure fluid is trapped in the space above the piston 17' of the leveling cylinder 17 by the check valve 48, but fluid from the space below the piston 16' of leveling cylinder 16 is free to return to sump through branch passage 47", conduit 47, first valve outlet 46, outlet chamber 51, second outlet 53 and conduit 54. Similarly, pressure fluid is trapped in the space above piston 16' of leveling cylinder 16 by the check valve 61, but fluid from the space below the piston 17' of leveling cylinder 17 is free to return to sump through branch passage 59", conduit 59, third valve outlet 58, chambers 56, 49, internal passage 52, outlet chamber 51, second outlet 53 and conduit 54.

When an electrical energizing circuit for the first solenoid 42 is closed in response to lateral tilting of the combine body 1 to the left in FIG. 1, as will be explained more fully hereinbelow, the spool 41 of the primary valve 37 shifts from the neutral position to the right, as viewed in FIG. 1. As a result of such shifting of the valve spool 41, pressure fluid entering through the inlet port 45 into the inlet chamber 44 is directed to the third outlet 58 and into the passage 59, while the passage 47 remains in communication with the sump S through the first outlet port 46, outlet chamber 51, second outlet 53 and conduit 54. Pressure buildup in the conduit 59 and branch passages 59', 59" causes actuation of the leveling cylinders so as to right the combine body from its hypothetical position of lateral inclination to the left as viewed in FIG. 1.

At the leveling cylinder 16, the pressure fluid passing through the check valve 61 enters the space above the piston 16' and causes upward push on the pivot connection 18. Also, as a result of pressure buildup in the cylinder space above piston 16', the check valve 48 is opened automatically so that the fluid from the cylinder space above piston 17' may return to sump through branch 47', conduit 47, first outlet 46, chamber 51, second outlet 53 and conduit 54.

At the leveling cylinder 17, pressure fluid passing through the branch passage 59" into the cylinder space below piston 17 causes downward pull on the pivot connection. During the resulting righting movement of the combine body 1 fluid from the cylinder space below piston 16' and from the cylinder space above piston 17' returns to sump through branches 47', 47", conduit 47, first outlet 46, chamber 51, second outlet 53 and conduit 54.

The foregoing explanations of the leveling action which causes righting of the combine body from a position of lateral inclination to the left, as viewed in FIG. 1, similarly apply to the righting of the combine body from a position of lateral inclination to the right, as viewed in FIG. 1. That is, if the combine body tilts to the right, an electrical energizing circuit for the second solenoid 43 is automatically closed and as a result the valve spool 41 of the primary valve 37 is shifted from its neutral position to the left as viewed in FIG. 1. Such shifting of the valve spool to the left pressurizes the conduit 47 and leaves the conduit 59 in fluid communicating relation with the sump conduit 54 through the third outlet 58, chambers 56, 49, internal passage 52, chamber 51 and second outlet 53. Pressure buildup in the conduit 47 and branch passages 47', 47", causes upward push on the pivot connection 19, downward pull on the pivot connection 18, and automatic opening of the check valve 61. During the resulting righting movement of the combine body 1 fluid from the cylinder space above piston 16' and from the cylinder space below piston 17' passes into conduit 59 through branch passages 59' and 59", respectively; the check valve 61 being automatically kept open by pressure buildup in the cylinder space above piston 17'.

The secondary control valve 38 as shown in FIG. 1 is a two position, solenoid operated spool valve of conventional construction. It comprises a housing 62, a spring centered valve spool 63 and a solenoid 64. The conduit 36 connects the outlet port 31 of the flow divider valve 23 with an inlet port 66 of the secondary control valve 38. Fluid entering the inlet port 66 is discharged from the valve housing either through a first outlet port 67 which is connected to sump through a conduit 68, or through a second outlet port 69 which is connected with the inlet port 45 of the primary valve 37 through a conduit 71.

In FIG. 1, the secondary control valve is shown in a deenergized neutral condition in which it diverts all of the fluid entering through inlet port 66 to the first outlet port 67. When the solenoid 64 is energized in response to tilting of the combine body to either side beyond a predetermined angle, as will be described more fully hereinbelow, the spool 63 of the secondary control valve is shifted from its neutral position to the left, as viewed in FIG. 1. As a result, all of the fluid entering through the inlet port 66 of the secondary valve will then be directed to the second outlet port 69.

The electrical circuit for energizing the first and second solenoids 42 and 43, and the third solenoid 64 is schematically shown in FIGS. 1 and 2. It incorporates a level sensitive mercury switch 72 which is outlined in FIG. 1 and shown in greater detail in FIG. 2.

Referring to FIG. 2, the switch 72 comprises a rectangular panel 73 of nonconductive plastic material, four terminals 74, 76, 77, 78 which are mounted on the outside of the panel at one side thereof, and an internal body of mercury 79 which serves as a switching medium for connecting the terminal 74 sequentially with the terminals 76 and 77 when the combine body 1 tilts laterally from its upright position to the left as viewed in FIG. 1, and for connecting the terminal 74 sequentially with the terminals 78 and 77 when the combine body 1 tilts laterally from its upright position to the right as viewed in FIG. 1.

The panel 73 is suitably installed on the combine body 1 as indicated by the dashed outline 71' in FIG. 1 so that the parallel top and bottom edges 80 and 81 (FIG. 2) of the panel extend transversely of the combine body and so that they will be positioned horizontally when the combine body is in its level upright position. Mounting studs 82 and 83 on the combine body extend through holes 84, 86, respectively, of the switch panel 73 in order to secure the latter to the combine body. As shown in FIG. 2, the panel 73 has an elongated interior duct 85 which extends parallel to the bottom edge 81 of the panel and normally in a horizontal direction. At its opposite ends, the duct 85 communicates with interior upwardly extending risers 87 and 87'. At the laterally outer sides of the risers 87 and 87', the panel 73 has interior pockets 88 and 89, respectively. The pocket 88 communicates with the upper end of the riser 87 through a short passage 91, and the pocket 89 similarly communicates with the upper end of the riser 87' through a short passage 92. Another pair of interior pockets 93 and 94 are formed within the panel 73 at the laterally outer sides, respectively, of the pockets 88 and 89. The pocket 93 communicates with an upward extension of the pocket 88 through a short passage 96 which is formed within the panel 73 on a higher level than the passage 91. Similarly the pocket 94 communicates with an upward extension of the pocket 89 through a short passage 97 on a higher level than the passage 92.

An elongated auxiliary interior duct 98 in the upper part of the panel 73 communicates at one end with upward extensions of the riser 86, pocket 88 and pocket 93; and at its other end the auxiliary duct 98 communicates similarly with upward extensions of the riser 87, pocket 89 and pocket 94. Midway its length the duct 98 communicates with a downwardly extending reservoir 99 for a pool of mercury 101.

An electrode 102 extends transversely of the panel 73 into the riser 86 and is connected with the terminal 74 by a lead 103. Smiliarly, an electrode 104 extends into the riser 87 and is connected with the terminal 74 by a lead 106. Electrodes 107, 108 extend into the pockets 88, 89, respectively; and leads 109 and 111 connect the electrodes 107, 108 with the terminals 76 and 78, respectively. Electrodes 112, 113 extend into the pockets 93 and 94, respectively; and leads 114, 116 connect the electrodes 112, 113, respectively, with the terminal 77.

In the level or horizontal position of the panel 73 as shown in FIGS. 1 and 2, the body of mercury 79 fills the duct 84 and stands in the risers 86, 87 at the same height, the top of the mercury column in the riser 86 being somewhat below the level of the passage 91, and the top of the mercury column in the riser 87 being somewhat below the level of the passage 92. The amount of mercury which is stored in the duct 84 and risers 86 and 87 may be increased by transferring mercury from the reservoir 99 into one or the other of the risers 86, 87; and it may be decreased by transferring mercury from one or the other of the risers to the reservoir. Preferably the selected amount of mercury in the duct 84 and risers 86, 87 is such that lateral tilting of the combine body from its level position in which it is shown in FIG. 1, through an angle of about three degrees toward the left in FIG. 1 causes the mercury in riser 86 to spill through the passage 91 into the pocket 88, and so that tilting of the combine body through a like angle in the opposite direction causes mercury in the riser 87 to spill through the passage 92 into the pocket 89. Further, the level of the passages 96 and 87 is spaced upwardly from the level of the passages 91 and 92 such a distance that lateral tilting of the combine body to the left in FIG. 1 beyond the three degrees inclination to an inclination of about five degrees will cause spilling of mercury from the riser 86 into the pocket 93 through the passage 96, and so that a similar tilting of the combine body to the right in FIG. 1 will cause spilling of mercury from the riser 87 into the pocket 94 through the passage 97.

Electric energy for actuating the solenoids 42, 43 and 64 is preferably derived from the storage battery of the combine which is symbolically shown in FIGS. 1 and 2 and designated by the reference character 117. One terminal of the battery is grounded as usual, and the other terminal is connected with the contact arm 118 of a five position rotary switch 119 of conventional construction. For automatic operation of the herein disclosed leveling system the contact arm 118 is adjusted to the center position in which it is shown in FIG. 2 and in which it connects the battery 117 with the terminal 74 of the mercury switch 72 through a lead 121.

Tilting of the combine body 1 to the left in FIG. 1 through an angle of about three degrees connects the terminal 74 with the terminal 76 due to spillage of mercury from the riser 86 into the pocket 88. As a result, current will flow from the switch terminal 76 through a lead 122 to the solenoid 42 and energize the latter so as to shift the valve 41 to the right in FIG. 1. Such shifting, as explained hereinbefore, causes return swinging of the combine body to its level position which, in turn, interrupts current flow to the solenoid 42 due to separation of the mercury column in the riser 86 from the pocket 88.

Restoration of the combine body to its level position from a three degrees lateral inclination should take place at a relatively slow rate of speed. This purpose is accomplished by suitably proportioning the regulated flow of pressure fluid from the flow divider 23 through the conduit 34. While such regulated flow of pressure fluid passes to the primary valve 31, a substantial excess flow of pressure fluid is returned from the flow divider to sump through conduit 36, secondary valve 38 and conduit 68.

If the combine body tilts to the left in FIG. 1 beyond the above mentioned three degrees inclination, an electrical connection from the terminal 74 to the terminal 77 is established by spillage of mercury from the riser 86 into the pocket 93 while the terminal 74 remains connected with the terminal 76 due to contact of the mercury in riser 86 with the electrode 107 of pocket 88. As a result, current will then flow simultaneously from terminal 76 through solenoid 42, and from terminal 77 through a lead 123 and solenoid 64. Such current flow through the solenoid 64 causes shifting of the valve spool 63 to the left in FIG. 1 into a position in which the first outlet port 67 is closed and the second outlet port 69 is brought into fluid communication with the inlet port 66.

Under these conditions the primary valve 37 will be supplied with pressure fluid from both divisional flow outlets 29 and 31 of the flow divider valve 23. The volume of pressure fluid which is forced into the leveling cylinders 16 and 17 in order to right the combine body from a position of lateral tilt to the left in FIG. 1 of five degrees or more will therefore be substantially larger than the volume of pressure fluid which is forced into the leveling cylinders in order to right the combine body from a position of lateral tilt to the left in FIG. 1 between three and five degrees.

When the combine body swings back from a laterally inclined position of five degrees or more to a laterally inclined position of three degrees to the left in FIG. 1, the solenoid 64 is automatically deenergized by separation of the mercury column in riser 86 from the pocket 93. However, the righting action will continue due to pressure fluid delivery from the flow divider outlet port 29 until the mercury column in riser 86 becomes separated from the pocket 88.

It will thus be seen that righting of the combine body from a laterally inclined position of five degrees or more to the left in FIG. 1 to a laterally inclined position of three degrees to the left from vertical in FIG. 1 will take place much faster than righting from the three degrees inclination to vertical which has been described hereinbefore.

The foregoing explanations regarding the leveling of the combine body upon tilting to the left as viewed in FIG. 1 similarly apply to tilting of the combine body to the right. Spillage of mercury from the riser 87 of the mercury switch 72 into the pocket 89 when the combine body tilts to the right of FIG. 1 through an angle of three degrees causes current flow from the battery 112 via arm 118, lead 121, terminal 74, leads 106, 111, terminal 78 and lead 124 to solenoid 43 of the primary valve 37. As a result, pressure fluid from the controlled flow outlet 29 of the flow divider valve 23 will pass into the leveling cylinders 16 and 17, and return the combine body to a level position at a relatively slow speed. Again, spillage of mercury from the riser 87 into the pocket 94 when the combine body tilts further to the right in FIG. 1 to an inclination of five degrees or beyond, causes current flow from the battery 117 to the solenoid 64 of the secondary valve 38 via contact arm 118, lead 121, terminal 74, leads 106, 116, terminal 77 and lead 123. As a result, the leveling cylinders 16, 17 will be supplied with a relatively large volume of pressure fluid from both outlets of the flow divider valve 23, and the combine will tilt back to the three degrees inclination at a relatively fast rate of speed, and then back to its level position at a relatively slow rate of speed.

The hydraulically piloted check valves 48 and 61 are preferably built into the heads of the cylinders 16 and 17, respectively. Such arrangement of the check valves, their construction and mode of operation are well known in the art, and they are therefore believed to require no further discussion. Their principal function is to trap pressure fluid in the cylinder spaces above the pistons 16' and 17' when the primary valve 37 is in its neutral, de-energized condition in which it is shown in FIG. 1.

The contact arm 118 of the switch 119 may be manually adjusted to the left or right from the center position in which it is shown in FIGS. 1 and 2. Adjustment of the arm 118 to the position indicated by the reference character 126 in FIG. 2 or to the position indicated by the reference character 127 isolates the battery 117 from the mercury switch 72.

Adjustment of the contact arm 118 to the position indicated in FIG. 2 by the reference character 128 energizes the solenoid 42 of the primary valve 37 and causes immediate tilting of the combine body 1 to the right in FIG. 1, irrespective of whether the combine body is level or not at the time the contact arm 118 is moved to position 128.

Similarly, adjustment of the contact arm 118 to the position indicated in FIG. 2 by the reference character 129 energizes the solenoid 43 of the primary valve 37 and causes immediate tilting of the combine body to the left in FIG. 1, irrespective of whether the combine body is level or not when the contact arm 118 is moved to position 129.

The mercury switch 72 represents, in effect, a level sensitive switch device comprising two double pole switches, one at the left end of the panel 73 and the other at the right end. At the left end of the panel, as viewed in FIG. 2, the two electrodes or poles 107, 112 and the mercury in riser 86 are operative to successively energize the first and third solenoids 42 and 64 upon progressive tilting of the combine body from a level position in one direction; and at the right end of the panel 73 the two electrodes or poles 108, 113 and the mercury in riser 87 are operative to successively energize the second and third solenoids 43 and 64 upon progressive tilting of the combine body in the other direction.

Figure 3:
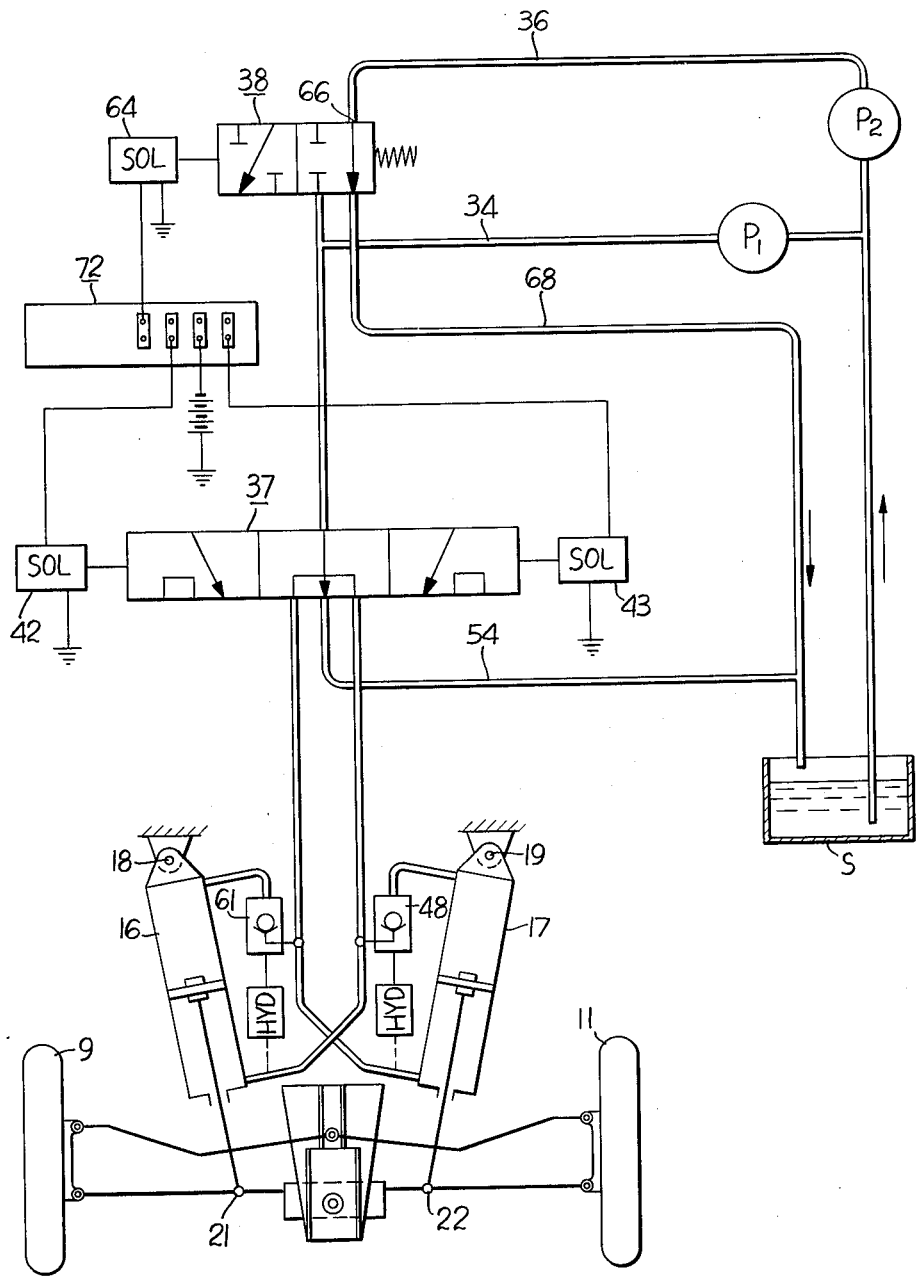
FIG. 3 is a diagram illustrating a modification of the system shown in FIGS. 1 and 2.

FIG. 3 shows a modification of the system shown in FIGS. 1 and 2, the modification residing in the substitution of a pump P2 shown in FIG. 3 for the flow divider valve 23 shown in FIGS. 1 and 2. The pump P2 is preferably coupled to the pump P1 so that both pumps will be driven in unison from the combine engine, not shown. At its inlet side the pump P2 is connected to the sump S, the same as the pump P1; and at its outlet side the pump P2 is connected to the inlet port 66 of the secondary control valve 38. In all other respects the system shown in FIG. 3 is identical with the system shown in FIGS. 1 and 2.

In the condition of the system as shown in FIG. 3, the pressure fluid from pump P1 returns to sump through conduit 34, primary valve 37 and conduit 54. The pressure fluid from pump P2 returns to sump through conduit 36, secondary valve 38 and conduit 68.

Tilting of the mercury switch 72 to the left in FIG. 3 first causes the solenoid 42 to be energized with consequent tilting of the combine body to the right at a relatively slow rate by the output of pump P1 while pump P2 continues to discharge to sump. Progressive tilting of the mercury switch 72 to the left to five degrees or beyond causes the solenoid 64 to be energized with consequent additional fluid supply to the primary valve 37 and consequently more rapid tilting of the combine body to the right. Analogous leveling actions take place upon progressive tilting of the mercury switch 72 to the right in FIG. 3.

Conventional arc suppressing capacitors 130 are suitably incorporated in the electrical circuit as shown in FIG. 1 and also in FIG. 2.

It should be understood that it is not intended to limit the invention to the details of construction herein shown and described, and that the invention includes such other forms and modifications as are embraced by the scope of the appended claims.

The embodiments of the invention in which an exclusive property or privilege is claimed are defined as follows:

1. An automatic leveling system for hillside combines comprising, hydraulic cylinder means operatively interposed between the combine body and its associated running gear for righting said combine body from laterally inclined positions; a source of hydraulic fluid pressure; fluid distributing means connected in fluid receiving relation with said source and in fluid delivering relation with said cylinder means and including sequentially operable primary and secondary valve means for successively increasing the flow rate of pressure fluid from said source to said cylinder means; and actuating means for said primary and secondary valve means including a position responsive control device mounted on said combine body for tilting movement therewith relative to said running gear, whereby said cylinder means will be energized by pressure fluid delivery thereto from said source at a predetermined rate upon lateral tilting of said combine body through a predetermined angle in either direction, and whereby said cylinder means will be energized by an increased rate of pressure fluid delivery thereto from said source upon lateral tilting of said combine body beyond said predetermined angle in either direction.

2. An automatic leveling system for hillside combines comprising, hydraulic cylinder means operatively interposed between the combine body and its associated running gear for righting said combine body from laterally inclined positions; a volumetrically constant source of pressure fluid; a flow divider valve having an inlet port in fluid receiving relation with said source and two divisional flow outlet ports; primary valve means connected in fluid receiving relation with one of said flow divider outlet ports, and in fluid delivering relation with said cylinder means; secondary valve means connected in fluid receiving relation with the other of said flow divider outlet ports and in fluid delivering relation with said primary valve means; and position responsive control means for said primary and secondary valve means mounted on said combine body, whereby said cylinder means will be energized by pressure fluid delivered to said primary valve means from said one flow divider outlet port upon lateral tilting of said combine body through a predetermined angle in either direction, and whereby said cylinder means will be energized by pressure fluid delivered to said primary valve means from both of said flow divider outlet ports upon lateral tilting of said combine body beyond said predetermined angle in either direction.

3. An automatic leveling system for hillside combines as set forth in claim 2, wherein said position responsive control means comprises first and second actuating solenoids for said primary valve means, a third actuating solenoid for said secondary valve means, and electrical energizing means for said solenoids including a level sensitive switch device mounted on said combine body for tilting movement therewith; said switch device comprising two double pole switches, one operative to successively energize said first and third solenoids upon progressive tilting of said combine body from a level position in one direction, and the other double pole switch being operative to successively energize said second and third solenoids upon progressive tilting of said combine body from a level position in the other direction.

4. An automatic leveling system for hillside combines as set forth in claim 3, and further comprising auxiliary switch means operatively associated with said position responsive switch means and selectively adjustable manually to a first position affording full automatic control of said first, second and third solenoids by said level sensitive switch device; or to a second position energizing said first solenoid and precluding automatic control of said second and third solenoids; or to a third position energizing said second solenoid and precluding automatic control of said first and third solenoids.

5. An automatic leveling system for hillside combines comprising, double acting hydraulic cylinder means operatively interposed between the combine body and its associated running gear for righting said combine body from laterally inclined positions; a primary valve having an inlet port, first, second and third outlet ports, and a movable valve body selectively adjustable from a first position in which it connects said inlet port with all of said outlet ports, to a second position in which it connects said inlet port with said first outlet port while connecting said second and third outlet ports with each other, or to a third position in which it connects said inlet port with said third outlet port while connecting said first and second outlet ports with each other; conduit means connecting said first and third outlet ports with opposite ends, respectively, of said double acting cylinder means; a sump connected with said second outlet port; a secondary valve having an inlet port, a first outlet port connected with said sump, a second outlet port connected with said inlet port of said primary valve, and a valve body selectively adjustable to first and second positions in which it connects said inlet port of said secondary valve with said first and second outlet ports, respectively, of said secondary valve; pressure fluid supply means connected in fluid receiving relation with said sump and in pressure fluid delivering relation with said inlet ports of said primary and secondary valves; and position responsive control means for said primary and secondary valves mounted on said combine body for lateral tilting therewith; said control means being operative to adjust said valve body of said primary valve from said first to said second and third positions thereof, respectively, upon lateral tilting of said combine body from a level position through a predeterminel angle in opposite directions, and to adjust said valve body of said secondary valve from said first to said second position upon lateral tilting of said combine body in either direction beyond said predetermined angle.

6. An automatic leveling system for hillside combines as set forth in claim 5, wherein said pressure fluid supply means comprise a fluid pump connected at its suction side with said sump; and a flow divider valve having an inlet port connected with the pressure side of said pump, and divisional flow outlet ports connected, respectively, with the inlet ports of said primary and secondary valve.

7. An automatic leveling system for hillside combines as set forth in claim 5, wherein said pressure fluid supply means comprise first and second pumps connected at their suction sides with said sump and at their pressure delivery sides with said inlet ports of said primary and secondary valves, respectively.

8. An automatic leveling system for hillside combines as set forth in claim 5, wherein said position responsive control means for said primary and secondary valves comprise first and second actuating solenoids for said primary valve; a third actuating solenoid for said secondary valve and electrical energizing means for said solenoids including a level sensitive mercury switch having a first section for controlling said primary and secondary valves in response to lateral tilting of said combine body in one direction, and a second section for controlling said primary and secondary valves in response to lateral tilting of said combine body in the other direction.

References Cited by the Examiner

UNITED STATES PATENTS 2,888,272    5/1959    Fletcher _____ 280—124
2,920,636    1/1960    Gassner _____ 280—6 X BENJAMIN HERSH, *Primary Examiner.*

A. H. LEVY, *Examiner.*